United States Patent
Neil

(10) Patent No.: US 7,641,755 B2
(45) Date of Patent: Jan. 5, 2010

(54) ASSEMBLY FOR FORMING A CERAMIC ARC DISCHARGE VESSEL AND METHOD OF MANUFACTURE

(75) Inventor: Jeffrey T. Neil, North Reading, MA (US)

(73) Assignee: Osram Sylvania Inc., Danvers, MA (US)

( * ) Notice: Subject to any disclaimer, the term of this patent is extended or adjusted under 35 U.S.C. 154(b) by 449 days.

(21) Appl. No.: 11/468,058

(22) Filed: Aug. 29, 2006

(65) Prior Publication Data

US 2008/0053611 A1    Mar. 6, 2008

(51) Int. Cl.
*B32B 38/04* (2006.01)
(52) U.S. Cl. ............ 156/272.2; 156/82; 156/89.11; 156/292; 156/497; 156/580; 156/583.1
(58) Field of Classification Search ......... 156/89.11, 156/89.12, 272.2, 82, 292, 497, 580, 583.1
See application file for complete search history.

(56) References Cited

U.S. PATENT DOCUMENTS 5,580,407 A * 12/1996 Haisma et al. ............... 156/153
6,620,272 B2 * 9/2003 Zaslavsky et al. ........... 156/73.5

* cited by examiner

*Primary Examiner*—Mark A Osele
*Assistant Examiner*—Nickolas Harm
(74) *Attorney, Agent, or Firm*—Robert F. Clark

(57) ABSTRACT

An assembly for forming a hollow, ceramic arc discharge vessel for high-intensity discharge (HID) lamps is described wherein a means for self-alignment of two molded sections is provided. In particular, the sealing surface of one section of the arc discharge vessel is provided with a convex surface and the sealing surface of the other section is provided with a concave surface. The radius of the convex sealing surface is smaller than the radius of the concave sealing surface so that the sections may self-align during joining, preferably without gas entrapment in the seal.

3 Claims, 1 Drawing Sheet

ASSEMBLY FOR FORMING A CERAMIC ARC DISCHARGE VESSEL AND METHOD OF MANUFACTURE

TECHNICAL FIELD

This application relates to methods of joining ceramic components in their green state. In particular, this application relates to a method of joining ceramic arc discharge vessel parts to form a unitary body for high intensity discharge (HID) lamps and to the arc discharge vessel so formed.

BACKGROUND OF THE INVENTION

In general, commercial ceramic arc discharge vessels used in high intensity discharge (HID) lamps are comprised of a polycrystalline alumina ceramic, which may contain one or more additives to control grain growth. As a first step, alumina powder is mixed with a binder material such as a wax or thermoplastic and then formed into the desired shape by isostatic pressing, extrusion, or injection molding. The binder materials help the molded alumina piece retain its shape while the piece is in its "green state," i.e., prior to binder removal and sintering. The binder is later removed when the pieces are fired.

Since the arc discharge vessels are fabricated from two or more pieces, it is necessary to form hermetic seals at the interfaces between the pieces, which hermetic seals are capable of withstanding the high stresses, temperatures and corrosive chemicals present in an operating arc discharge vessel. The conventional method of assembling ceramic arc discharge vessel pieces involves several assembly and pre-sintering steps in which the pieces are aligned and sealed together by means of interference fits. The interference fits result from the differential shrinkage of the pieces during firing. In each of the assembly and pre-sintering steps, there exists an opportunity for misalignment or other errors to occur. Minimizing the number of firing cycles can improve the efficiency of the arc discharge vessel production process. Furthermore, the practice of using interference fits to form the hermetic seals requires a high degree of control over dimensional tolerances and the shrinkage of the ceramic pieces during firing.

Several methods are available for solving the disadvantages enumerated above. One method, which is preferred, comprises joining two body halves in the green state. The method includes applying heat to the surfaces to be joined to cause a localized melting of the binder. The surfaces are then brought together and joined by applying compression. Another method is disclosed in U.S. Pat. No. 6,620,272, which is incorporated herein by reference, and comprises a method for making a ceramic body wherein the ceramic components are joined in their green state. The method includes applying heat to the surfaces to be joined to cause a localized melting of the binder. The surfaces are then brought together and joined by alternately applying compression and stretching. These methods are particularly advantageous for forming unitary ceramic arc discharge vessel bodies for high intensity discharge (HID) lighting applications; however, it has been found that these processes, while extremely efficient for ordinary ceramic arc discharge vessels, have a potential for axial misalignment during the joining process which may be detrimental to certain types of ceramic metal halide lamps, particularly those that use acoustically stabilized arcs.

Misalignment of the two halves of the discharge vessel during the joining process can be reduced by careful adjustment of the joining equipment to insure that the two carriers of the ceramic parts are as close to coaxial as possible. However, as described above, even careful alignment may not be sufficient for certain types of arc discharge vessels, particularly ones that require smaller diameters. In these case, it may become necessary to resort to visual inspection to remove misaligned parts. Thus, for such high efficiency lamp designs, it would be advantageous to have a method that would minimize or eliminate altogether axial misalignment of the ceramic parts that form the discharge cavity.

SUMMARY OF THE INVENTION

It is, therefore, an object of the invention to obviate the disadvantages of the prior art.

It is another object of the invention to enhance arc discharge vessel manufacturing.

It is yet another object of the invention to provide a two-piece assembly for forming an arc discharge vessel that is suitable for use with an acoustically stabilized arc.

The present invention provides a means for self-alignment of the two sections during the joining process. In particular, the sealing surface of one section of the arc discharge vessel is provided with a convex surface and the sealing surface of the other section is provided with a concave surface. The radius of the convex sealing surface is smaller than the radius of the concave sealing surface so that the sections may be joined without trapping gas in the seal. Preferably, the radius of curvature of the concave surface is equal to the thickness of the wall of the discharge vessel in the region adjacent to the joining edges and the radius of curvature for the convex sealing surface is 75% of the wall thickness.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

Figure 1:
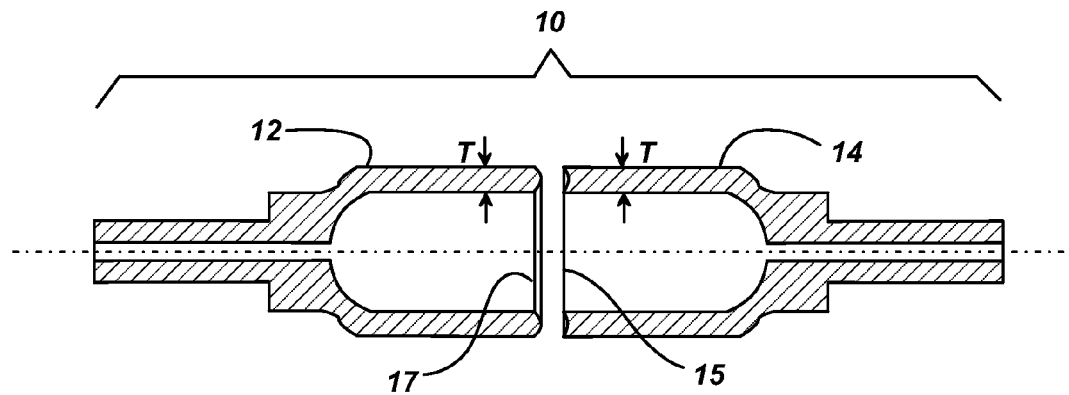
FIG. 1 is a cross-sectional illustration of an embodiment of the invention.

Referring now to the drawings with greater particularity, there is shown in FIG. 1 an assembly for forming a hollow, ceramic arc discharge vessel. The assembly has a two-piece hollow ceramic body 10 comprised of a first section 12 and a second section 14. The first and second sections 12, 14 have a wall thickness T in a region adjacent to joining edges 15 and 17. Preferably, the two sections are axially symmetric.

Figure 2:
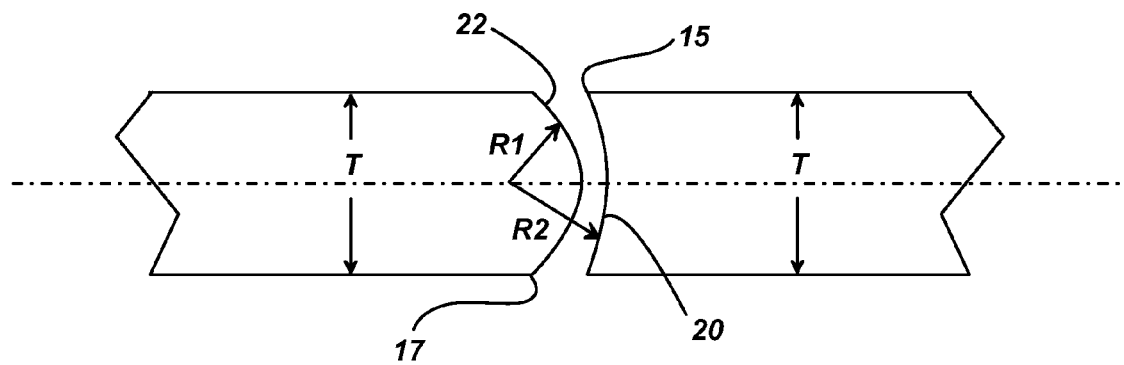
FIG. 2 is an enlarged view of the joining edges.

Referring to FIG. 2, an enlarged illustration of the cross section near the joining edges 15 and 17 is shown. Joining edge 17 has a convex sealing surface 22 with a radius of curvature R1 and joining edge 15 has a concave sealing surface 20 with a radius of curvature R2, wherein R2 is greater than R1. In a preferred embodiment, R1 is three-fourths of the wall thickness, 0.75 T, and R2 is equal the wall thickness, T. When the two sealing surfaces 20, 22 are brought together during joining, the two joining edges 15, 17 should self-align and promote an improved degree of axial alignment. The improved alignment should offset the added costs of needing two different molds for each section, particularly in the manufacture of lamps using an acoustically stabilized arc. Also, because the radius of curvature R2 is larger for the concave sealing surface 20, gas entrapment in the seal during joining should be minimal as the gas should be swept out of the seal as the two sections are brought into contact.

In a preferred method for forming the arc discharge vessel, the sections 12, 14 are joined by simultaneously heating the sealing surfaces 20, 22 to cause localized melting of the binder material; initially contacting the sealing surfaces with the second joining surface to form an interface region; and applying compression to the interface region to join the first section to the second section.

Preferably, the surfaces are heated by convection with a heated gas (e.g., forced hot air). Other methods of heating may include radiative heating by an infrared laser, an incandescent lamp, or an incandescent resistive element. In order to improve heating uniformity, the sections may be rotated about their axis while heating. Once the binder material at the surface has melted, the sections are quickly mated by contacting the sealing surfaces and applying compression to the interface region. Alternatively, the sealing surfaces may be joined without heating by chemically treating the sealing surfaces to soften the binder and cause the sections to stick together.

Figure 3:
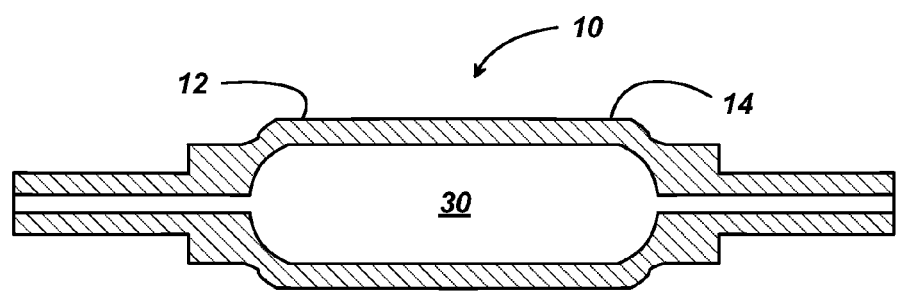
FIG. 3 is a cross-sectional illustration of a joined arc discharge vessel.

FIG. 3 shows a cross-sectional illustration of the arc discharge vessel after the sections are thermally joined. A unitary arc discharge vessel body 10 is produced defining the arc discharge cavity 30. When the arc discharge vessel body 10 is sintered, the resulting hermetic seal between the two sections is capable of withstanding the harsh environment of the operating arc discharge vessel.

While there have been shown and described what are at present considered to be the preferred embodiments of the invention, it will be apparent to those skilled in the art that various changes and modifications can be made herein without departing from the scope of the invention as defined by the appended claims.

What is claimed is:

1. A method of making a two-piece hollow ceramic body comprising the steps of:

forming a first section with a first joining edge and a second section with a second joining edge, the first and second sections containing ceramic material and a binder material, the first joining edge having a convex sealing surface having a radius of curvature R1, the second joining edge having a concave sealing surface having a radius of curvature R2, wherein R2 is greater than R1;

simultaneously heating the sealing surfaces to cause localized melting of the binder material;

initially contacting the sealing surfaces to form an interface region; and applying compression to the interface region to join the first section to the second section.

2. The method of claim 1 wherein the first and second sections have a wall thickness T in a region adjacent to the first and second joining edges, and R1 is equal to 0.75T and R2 is equal to T.

3. The method of claim 1 wherein the first and second sections are axially symmetric.

* * * * *